United States Patent [19]

Nagashima

[11] Patent Number: 4,813,139
[45] Date of Patent: Mar. 21, 1989

[54] CHAIN SAW

[75] Inventor: Akira Nagashima, Kawasaki, Japan

[73] Assignee: Kioritz Corporation, Tokyo, Japan

[21] Appl. No.: 42,885

[22] Filed: Apr. 27, 1987

[30] Foreign Application Priority Data

Apr. 30, 1986 [JP] Japan .............................. 61-65774[U]

[51] Int. Cl.⁴ .............................................. B27B 17/12
[52] U.S. Cl. ...................................... 30/123.4; 30/381
[58] Field of Search ...................... 30/123.4, 381, 383, 30/382, 384, 385, 386, 387

[56] References Cited

U.S. PATENT DOCUMENTS 2,650,626  9/1953  Kiekhaefer .................... 30/123.4
2,748,810  6/1956  Strunk ............................ 30/123.4
4,117,594 10/1978  Arbuckle ........................ 30/381
4,353,163 10/1982  Overbury et al. ............. 30/123.4

Primary Examiner—Frank T. Yost
Assistant Examiner—Michael D. Folkerts
Attorney, Agent, or Firm—Browdy and Neimark

[57] ABSTRACT

A chain saw in which a nipple is formed at the opening of an outlet of an oil pump, and an oil channel formed of a flexible pipe whose one end is connected to the nipple and whose other end opens into a chain guide groove of a chain guide bar.

2 Claims, 1 Drawing Sheet

CHAIN SAW

BACKGROUND OF THE INVENTION

1. Field of the Invention

This invention relates to a chain saw having an oil pump for supplying lubricating oil to a saw chain and an oil channel through which oil discharged from the outlet of this oil pump flows to a chain guide groove formed in a guide bar which guides the saw chain.

2. Description of the Prior Art

In general, in a conventional chain saw of this type, the oil channel is formed by boring through a portion of the main body of the chain saw, one end of this bore being aligned with and connected to the outlet of the oil pump, and the other end being aligned with and connected to the oil supply opening of the guide bar, or a metal pipe is used instead of this connection.

In this conventional construction, it is necessary to pay considerable attention to the leakage of oil from the connection surfaces between the outlet of the oil pump and the bore in the main body. Moreover, the designs of these parts are restricted with respect to their disposition and mounting, and it takes a large amount of labor to manufacture and assemble the chain saw.

SUMMARY OF THE INVENTION

It is therefore an object of the present invention to provide a chain saw which is free from the above-described problems of the conventional arrangement, and which has a simple construction and is convenient.

To this end, the present invention provides a chain saw which is provided with an oil pump having an outlet with a nipple, and an oil channel formed of a flexible pipe whose one end is connected to the nipple and whose other end opens into a chain guide groove in a guide bar.

While the construction in accordance with the present invention, one end of the flexible pipe is simply fitted and attached to the nipple of the oil pump in a liquid-tight manner, and the other end is attached to the guide bar in a liquid-tight manner. That is, the flexible pipe functions as an element which constitutes a liquid-tight structure in itself, thereby enabling the components to be freely disposed and reducing the size of the entire structure. The chain saw simplified in this way can be easily manufactured and assembled.

DESCRIPTION OF THE PREFERRED EMBODIMENT

Figure 1:
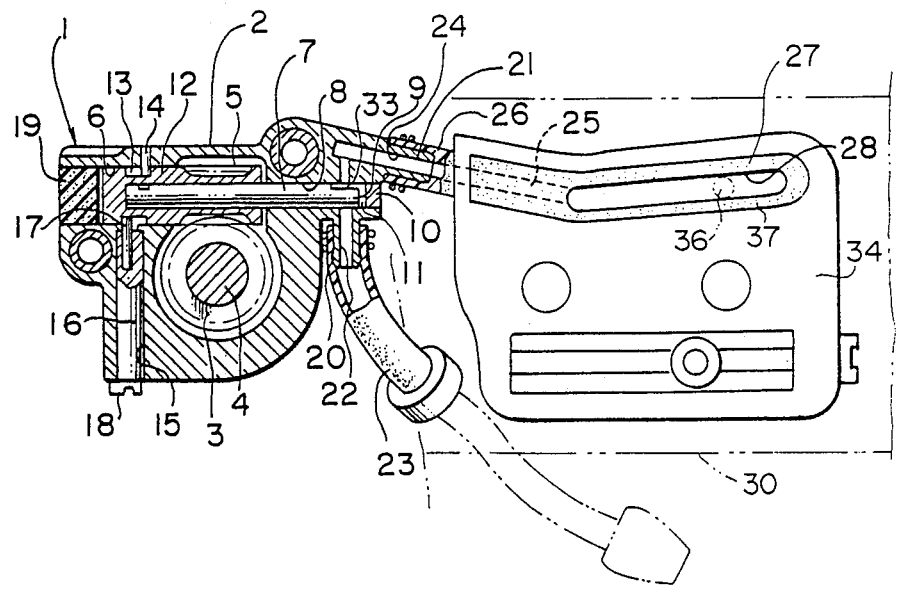
FIG. 1 is a fragmentary longitudinal cross-sectional view of essential parts of a chain saw which is an embodiment of the present invention.
Figure 2:
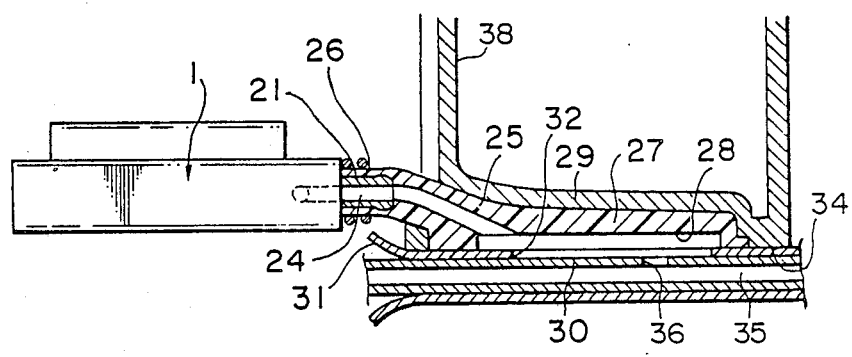
FIG. 2 is a fragmentary transverse cross-sectional view of the essential parts of the chain saw shown in FIG. 1.

A chain saw which represents an embodiment of the present invention will be described below with reference to the accompanying drawings.

An oil pump 1 is adapted to supply oil to a saw chain (not shown) of a chain saw. A main body 2 of the oil pump 1 is fixed in a position adjacent to that of a lubricating oil tank 38 in the main body of the chain saw. A worm 3 is attached to one end of a shaft 4 which is rotatably supported on the main body 2. The other end of the shaft 4 is driven by being connected to the output shaft of an internal combustion engine (not shown) mounted on the main body of the chain saw.

A plunger 7 which has a gear portion 5 adapted to be engaged with the worm 3 is fitted into bores 6 and 8 formed in the main body 2 so as to be rotatable and movable in the axial direction. The gear portion 5 is made of a suitable synthetic resin and is integrally and coaxially molded onto the plunger 7 which is formed from a suitable metal material which is worked to a degree of high accuracy. The plunger 7 projects from the gear portion 5 in the axial direction and constitutes a pumping plunger of the pump 1. A pumping chamber 11 is defined between the tip 9 of one end of the plunger 7 and a closing member 10 adapted to close the end of the bore 8.

The plunger 7 also has a cam portion 12 integrally formed at its other end, in the axial direction, and a grooved cam 13 is formed around the cam portion 12. A guide pin 14 which projects inward from the inner peripheral surface of the bore 6 is embedded in the main body 2, and the inner end of the guide pin 14 projects toward the grooved cam 13. A shaft 16 is rotatably fitted into a bore 15 which is formed in the main body 2 so as to be perpendicular to the bore 6 formed at the side of the cam portion 12. The inner end of the shaft 16 has an eccentric pin 17 which is eccentric relative to the shaft 16 and which projects in the axial direction toward the grooved cam 13 at a position opposite to that of the guide pin 14. In this arrangement, the reciprocating movement of the cam portion 12 in the axial direction is limited by the guide pin 14 and the eccentric pin 17. That is, the range of the reciprocating motion of the cam portion 12 can be varied by changing the position of the eccentric pin 17 at the outer end 18 of the shaft 16 by rotating the shaft 16. The outer end of the bore 6 on the side of the cam portion 12 is closed by a closing member 19 made of sponge rubber impregnated with grease. The closing member 19 functions to prevent dust from entering the pump and retain the grease.

The main body 2 has an inlet nipple 20 and an outlet nipple 21 which are integrally formed with the main body 2 in positions near the pumping chamber 11. The inlet nipple 20 forms an inlet passage 22 which opens through the inlet nipple 20 to the side of the pumping chamber 11. The inlet passage 22 communicates with the oil tank 38 through a flexible pipe 23 which is fitted and connected to the inlet nipple 20. Similarly, the outlet nipple 21 forms an outlet passage 24 which communicates with the pumping chamber 11 through the outlet nipple 21. The outlet passage 24 opens into the pumping chamber 11 at the side thereof diametrically opposite to that at which the inlet passage 22 opens.

One end 26 of a flexible pipe 25 made of an elastic material such as rubber or synthetic resin is fitted and connected to the outlet nipple 21, and the other end 27 of the flexible pipe 25 has a laterally elongated opening 28 encircled by an exposed end surface 37 which generally coincides with a mounting seat surface 34 of a guide bar 30. The exposed end surface 37 of the flexible pipe 25 is pressed from the rear side by a part 29 of the main body of the chain saw so that it is closely fitted to a side plate 31 on the side of the mounting seat surface 34 of the guide bar 30 which guides the travelling of a saw chain. The opening 28 in the exposed end surface 37 communicates with an oil supply opening 36 formed in the guide bar 30 through a corresponding elongated opening 32 formed in the side plate 31.

When, in this arrangement, the worm 3 is rotated by the driving force of the internal combustion engine of the chain saw, the gear portion 5 which is engaging with the worm 3 rotates and reciprocatingly moves together with the plunger 7 in the axial direction. This reciprocating motion is effected within a range set by the grooved cam 13 and pins 14 and 17. The volume of the pumping chamber 11 is increased or decreased by the reciprocating motion of the tip 9 of the plunger 7 thereby caused. At the time of a suction stroke in this pumping operation which increases the volume of the pumping chamber 11, the outlet passage 24 is closed by the tip 9 of the plunger 7 but the inlet passage 22 communicates with the pumping chamber 11 through a cut portion 33 formed in the tip 9 of the plunger 7 so that oil in the oil tank 38 is drawn into the pumping chamber 11 by way of the flexible pipe 23 and the inlet passage 22. At the time of a discharge stroke which decreases the volume of the pumping chamber 11, the inlet passage 22 is closed by the tip 9 of the plunger 7 but the outlet passage 24 communicates with the pumping chamber 11 through the cut portion 33 so that oil in the pumping chamber 11 is discharged into the saw chain guide groove 35 through the oil supply opening 36 of the guide bar 30 by way of the outlet passage 24 and the flexible pipe 25, thereby lubricating the saw chain. The rate of the discharge of oil from the pumping chamber 11 is adjusted by rotating the shaft 16 so as to select a suitable position of the eccentric pin 17 and adjust the stroke of the reciprocating motion of the plunger 7.

What is claimed is:

1. A chain saw comprising an oil pump for supplying lubricating oil to a saw chain and an oil channel through which oil discharged from the outlet of said oil pump flows into a chain guide groove formed in a guide bar for guiding said saw chain, wherein a nipple is formed at the opening of said outlet of said oil pump, and wherein said oil channel is formed of a flexible pipe whose one end is connected to said nipple and whose other end has a first elongated opening defined by an exposed end surface, said guide bar including a mounting seat surface having an oil supply opening, and a side plate disposed adjacent to said mounting seat surface having a second elongated opening, wherein said exposed end surface generally coincides with the position of said mounting seat surface of the guide bar, and is closely fitted to said side plate on the side of said mounting seat surface, and said first elongated opening opens into said chain guide groove through said second elongated opening and said oil supply opening.

2. A chain saw according to claim 1 wherein the end surface of said flexible pipe opening into said chain guide groove is pressed from a rear side of the end surface by a portion of the main body of said chain saw so that said end surface is closely fitted to the side plate of said guide bar in a liquid-tight manner.

* * * * *